US012662416B2

(12) United States Patent
Borrelli et al.

(10) Patent No.: US 12,662,416 B2
(45) Date of Patent: Jun. 23, 2026

(54) QUANTUM DOT-DOPED GLASS AND A METHOD FOR MAKING

(71) Applicant: CORNING INCORPORATED, Corning, NY (US)

(72) Inventors: Nicholas Francis Borrelli, Elmira, NY (US); Anthony Paul Carapella, Campbell, NY (US); Aize Li, Painted Post, NY (US); Joseph Francis Schroeder, III, Lindley, NY (US); Haitao Zhang, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 155 days.

(21) Appl. No.: 18/388,896

(22) Filed: Nov. 13, 2023

(65) Prior Publication Data

US 2024/0383799 A1 Nov. 21, 2024

Related U.S. Application Data

(60) Provisional application No. 63/425,342, filed on Nov. 15, 2022.

(51) Int. Cl.
| | |
|---|---|
| *C03C 14/00* | (2006.01) |
| *C03C 3/089* | (2006.01) |
| *C09K 11/02* | (2006.01) |
| *C09K 11/88* | (2006.01) |

(52) U.S. Cl.
CPC ............ *C03C 14/004* (2013.01); *C03C 3/089* (2013.01); *C03C 14/006* (2013.01); *C09K 11/02* (2013.01); *C09K 11/025* (2013.01); *C09K 11/883* (2013.01); *C03C 2214/04* (2013.01); *C03C 2214/16* (2013.01)

(58) Field of Classification Search
CPC ..... C09K 11/02; C09K 11/025; C09K 11/883; C03C 11/04; C03C 11/006; C03C 3/089; C03C 2214/04; C03C 2214/16
See application file for complete search history.

(56) References Cited

U.S. PATENT DOCUMENTS

| | | | |
|---|---|---|---|
| 2,106,744 A | 2/1938 | Porter et al. | |
| 2013/0011551 A1* | 1/2013 | Zhou ......................... | C03C 3/06 977/840 |
| 2022/0380249 A1 | 12/2022 | Borrelli et al. | |

FOREIGN PATENT DOCUMENTS

| | | | |
|---|---|---|---|
| CN | 104529153 | * | 4/2015 |
| CN | 108467196 | * | 8/2018 |
| CN | 107266537 | * | 10/2018 |
| CN | 108467196 B | | 10/2020 |

OTHER PUBLICATIONS

Letant et al., "Study of porous glass doped with quantum dots or laser dyes under alpha irradiation", Appl. Phys. Lett. 2006, 88, 4 pages.
Luong et al., "Photopatterning of Metal Oxide Catalyst in Porous Glass", MRS Symposium Proc. 1986, vol. 75, 8 pages.

* cited by examiner

*Primary Examiner* — C Melissa Koslow
(74) *Attorney, Agent, or Firm* — Svetlana Z. Short

(57) ABSTRACT

The present disclosure relates to a quantum dot-doped glass and method of making the same. A quantum dot-doped glass includes glass that includes quantum dots in an internal structure of the glass. The quantum dots within the glass have a photoluminescence quantum yield of greater than or equal to 10%.

13 Claims, 6 Drawing Sheets

QUANTUM DOT-DOPED GLASS AND A METHOD FOR MAKING

CROSS-REFERENCE TO RELATED APPLICATIONS

This application claims the benefit of priority under 35 U.S.C. § 119 of U.S. Provisional Application No. 63/425, 342 filed Nov. 15, 2022, the content of which is incorporated herein by reference in its entirety.

BACKGROUND

Semiconductor nanocrystals (quantum dots) have attracted intense research interests in the past few decades. The typical size of quantum dot is less than 10 nm and is smaller than the Bohr radius of its electron and hole. As a result of spatial confinement of electron/hole wave functions, the electronic structure and band gap of quantum dots are dependent on particle size. Quantum dots therefore exhibit unique size-dependent photophysical properties, such as wavelength-tunable absorption and emission. Other advantages of quantum dots in optical applications include highly efficient emissions, narrow and symmetric emission spectra, and photostability. Researchers have long envisioned the use of quantum dots in optoelectronic devices such as light-emitting diodes (LEDs), photovoltaics (PVs), lasers, sensors, and luminescent solar concentrators (LSCs). Recently, quantum dots have been successfully commercialized in bioimaging and display technologies.

For applications, quantum dots (QD) should be placed inside a robust host to avoid air-degradation. Incorporating pre-synthesized quantum dots into bulk glass is difficult because the melted glass (typically melting at >300° C.) can easily destroy quantum dots. Although quantum dots embedded in glass have been synthesized via phase precipitation of semiconductors inside a glass host, the surface of quantum dots made by this method is not well passivated, which results in low emission efficiency (typically less than 2% quantum yield).

Quantum dots with good surface passivation are generally synthesized by the colloidal solution method. Colloidal quantum dots include a semiconductor core capped with a layer of organic surfactant ligands. The surfactant ligands provide "electronic" passivation of the terminate dangling bonds which would otherwise act as carrier traps to quench radiative emissions. In applications, colloidal quantum dots have been incorporated into a variety of organic polymers or fluids. However, the lifetime of these organic materials is short, especially when exposed to strong optical beams.

SUMMARY OF THE INVENTION

The present disclosure provides a quantum dot-doped glass. In some embodiments the quantum dot-doped glass comprises not greater than 0.2 wt % of F at in a 100 nm deep layer adjacent to the external surface of the glass. In some embodiments the quantum dot-doped glass comprises not greater than 0.1 wt % of F at in a 100 nm deep layer adjacent to the external surface of the glass. In some embodiments the quantum dot-doped glass and comprises not greater than 0.05 wt % F, and in some embodiments not greater than 0.01 wt % of F at in a 100 nm deep layer adjacent to the external surface of the glass. The and the quantum dots situated within the glass have a photoluminescence quantum yield of $\geq 10\%$.

According to some embodiments the quantum dot-doped glass comprises not greater than 0.002 wt % of F at in a 100 nm deep layer adjacent to the external surface of the glass. According to some embodiments the quantum dot-doped glass comprises not greater than 0.0015 wt % of F at in a 100 nm deep layer adjacent to the external surface of the glass. According to some embodiments the quantum dot-doped glass comprises 0 to 0.002 wt % of F at in a 100 nm deep layer adjacent to the external surface of the glass.

The quantum dots may be sealed within the glass via one or more layers of optically transparent material. Alternatively, the quantum dots may be situated in pores in the glass without the sealant. The quantum dots within the glass have a photoluminescence quantum yield of $\geq 10\%$. In some embodiments the quantum dots within the glass have a photoluminescence quantum yield of $\geq 20\%$, or even greater than 25%. For example, in some embodiments the quantum dots within the glass have a photoluminescence quantum yield of between 20% and 40%.

The present disclosure provides a quantum dot-doped glass. The quantum dot-doped glass includes porous borosilicate glass that comprises not greater than 0.2 wt % of F at in a 100 nm deep layer adjacent to the external surface of the glass and includes quantum dots dispersed in pores in a surface layer of the glass, the pores having a pore size of 2 nm to 20 nm. The quantum dots are sealed within the glass via one or more layers of optically transparent material including a layer including $A_2O_3$, $SiO_2$, $Si_3N_4$, or a combination thereof; a PVD- or PECVD-deposited layer having a thickness of 100 nm to 1000 nm, or a combination thereof. The surface layer has a thickness of 5 microns to 1000 microns. The quantum dots within the glass have a photoluminescence quantum yield of $\geq 10\%$, or $\geq 20\%$, for example $\geq 30\%$ (e.g., 20-40%).

According to some embodiments, the quantum dots are 0.0001 wt % to 5 wt % of the quantum dot-doped glass, and wherein the quantum dots have a diameter of 1 nm to 50 nm.

According to some embodiments, the pores comprising the quantum dots are in a surface layer of the glass, the surface layer having a thickness of 1 micron to 2000 microns, and the pores having a pore size of 1 nm to 50 nm.

According to some embodiments, the glass comprises porous borosilicate glass. According to some embodiments the quantum dots have a diameter of 1 nm to 10 nm.

According to some embodiments, the glass comprises: 60 to 80 mole % $SiO_2$; 0 to 12 mole % $Na_2O$, and 20 to 35 mole % $B_2O_3$. According to some embodiments, the glass comprises: 64 to 78 mole % SiO2; 0 to 9 mole % $Na_2O$, and 20 to 32 mole % $B_2O_3$. According to some embodiments, the glass comprises: 60 to 70 mole % $SiO_2$; 0 to 10 mole % $Na_2O$, and 20 to 35 mole % $B_2O_3$.

According to some embodiments, the glass comprises: 64 to 75 mole % $SiO_2$; 3 to 10 mole % $Na_2O$, and 20 to 30 mole % $B_2O_3$. According to some embodiments, the glass comprises: 60 to 70 mole % $SiO_2$; 5 to 12 mole % $Na_2O$, and 20 to 30 mole % $B_2O_3$. According to some embodiments, the glass comprises: 60 to 70 mole % $SiO_2$; 7 to 10 mole % $Na_2O$, and 20 to 30 mole % $B_2O_3$.

According to some embodiments the quantum dots comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, core/shell structures of any combination thereof, or combinations thereof. According to some embodiments the quantum dots comprise CdSe/ZnS core/shell quantum dots.

The present disclosure provides a method of forming a quantum dot-doped glass, the method comprising:

modifying a borosilicate glass surface to create or modify pores within the glass without HF, wherein the modified glass contains 0 to 0.2 wts of F, and preferably 0 to 0.1 wt % of F;

treating the pores within the borosilicate glass with a solution comprising quantum dots to place the quantum dots into pores in the glass wherein the quantum dots within the glass have a photoluminescence quantum yield of ≥10%, and optionally sealing the quantum dots within the glass via one or more layers of optically transparent material to form the quantum dot-doped glass.

The present disclosure also provides a method of forming a quantum dot-doped glass, the method comprising:

modifying a borosilicate glass surface to create or modify pores within the glass without HF, wherein the modified glass contains 0 to 0.01 wt % of F;

treating the pores within the borosilicate glass with a solution comprising quantum dots to place the quantum dots into pores in the glass wherein the quantum dots within the glass have a photoluminescence quantum yield of ≥10%, and optionally sealing the quantum dots within the glass via one or more layers of optically transparent material to form the quantum dot-doped glass. According to some embodiments the glass comprises porous borosilicate glass.

According to some embodiments the step of modifying the glass includes: modifying glass with $H_2SO_4$, $HNO_3$, HCl, $H_3PO_4$, $H_2O$, or combinations thereof prior to the treatment with the solution comprising the quantum dots.

According to some embodiments the method includes the step of annealing the glass after the modification.

According to some embodiments, the method further includes modifying the quantum dots prior to the treatment of the glass with the solution, the modifying comprising modifying the quantum dots with a surface-modifying material that reduces surface defects in the quantum dot, changes surface chemistry of the quantum dot, and/or increases quantum yield of the quantum dots doped in the glass, or a combination thereof.

According to some embodiments of the method the quantum dots have a diameter of 1 nm to 50 nm.

According to some embodiments the quantum dots have a diameter of 1 nm to 10 nm According to some embodiments of the method, quantum dots comprise CdSe/ZnS core/shell quantum dots.

According to some embodiments the method includes sealing the glass, wherein the sealing comprises:

using atomic layer deposition to deposit the one or more layers comprising a layer comprising $Al_2O_3$, $SiO_2$, $Si_3N_4$, or a combination thereof, using PVD- or PECVD-deposition to deposit the one or more layers comprising a PVD- or PECVD-deposited layer having a thickness of 100 nm to 1000 nm, or a combination thereof.

The present disclosure provides a method of forming the quantum dot-doped glass of the present disclosure. According to some embodiments the method includes treating a glass containing 0 to 0.2 wt % of F (e.g., 0 to 0.1 wt % of F and preferably 0 to 0.01 wt % of F) with a solution including quantum dots to form the quantum dot-doped glass.

The present disclosure provides a method of forming a quantum dot-doped glass. The method includes treating a glass containing 0 to 0.2 wt % of F (e.g., 0 to 0.1 wt % of F, or 0 to 0.01 wt % of F) with a solution including quantum dots to place the quantum dots into pores in the glass. The method includes sealing the quantum dots within the glass via one or more layers of optically transparent material to form the quantum dot-doped glass. The quantum dots within the glass have a photoluminescence quantum yield of ≥10%, ≥20%, or even ≥30%.

The quantum dot-doped glass and method of making the same of the present disclosure have various advantages over other quantum dot-doped glass and methods of making the same. For example, the quantum dots of the quantum dot-doped glass of the present invention can have bright photoluminescence, such as a photoluminescence yield of equal to or greater than 10%, 20%, 30%, or 40% or more. Such photoluminescence yield is higher than that of other quantum dot-doped glass, such as more than 10 times higher. The quantum dots of the quantum dot-doped glasses of the present invention can be sealed within the glass with an optically transparent $Al_2O_3$ or $SiO_2$ thin film, providing a robust host for the quantum dots. The internal structure of the glass used to form the quantum dot-doped glass of the present invention, and/or the surface of the quantum dots, can be modified to tune the optical properties of the quantum dots as desired.

BRIEF DESCRIPTION OF THE FIGURES

The drawings illustrate generally, by way of example, but not by way of limitation, various aspects of the present invention.

DETAILED DESCRIPTION

Figure 1A:
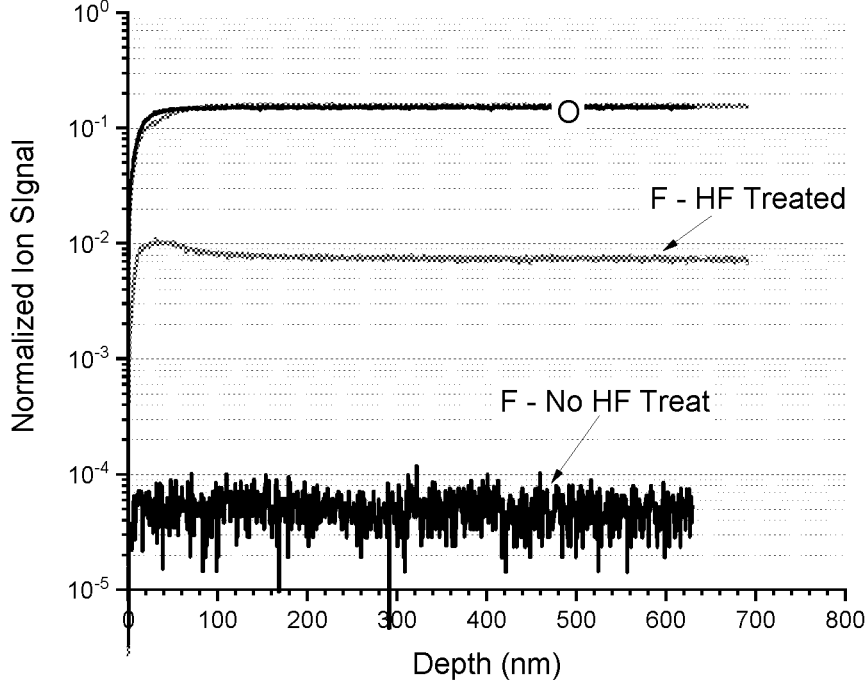
FIG. 1A illustrates glass sample of an exemplary embodiment that has a smaller amount of Fluorine (~100× less) relative to that of the comparative HF treated sample.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Quantum Dot-Doped Glass

Various aspects of the present disclosure provide a quantum dot-doped glass. The quantum dot-doped glass includes glass that includes quantum dots in an internal structure of the glass. The quantum dots within the glass can have a photoluminescence quantum yield of ≥10%.

According to some embodiments the quantum dot-doped glass comprises not greater than 0.2 wt % of F at in a 100 nm deep layer adjacent to the external surface of the glass. In some embodiments the quantum dot-doped glass comprises not greater than 0.1 wt % of F at in a 100 nm deep layer adjacent to the external surface of the glass. In some embodiments the quantum dot-doped glass and comprises not greater than 0.05 wt % F, in some embodiments not greater than 0.02 wt % of F and in some embodiments not greater than 0.01 wt % of F at in a 100 nm deep layer adjacent to the external surface of the glass. The quantum dots situated within the glass may have a photoluminescence quantum yield of ≥20%.

According to some embodiments the quantum dot-doped glass comprises not greater than 0.002 wt % of F at in a 100 nm deep layer adjacent to the external surface of the glass.

According to some embodiments the quantum dot-doped glass comprises not greater than 0.0015 wt % of F at in a 100 nm deep layer adjacent to the external surface of the glass. According to some embodiments the quantum dot-doped glass comprises 0 to 0.002 wt % of F in a 100 nm deep layer adjacent to an external surface of the glass.

The quantum dots can be doped within the glass in any suitable distribution therein. The quantum dots within the glass can be free of aggregates of the quantum dots, the aggregates having a largest dimension of greater than 50 nm and/or that includes more than 10 quantum dots aggregated together.

The quantum dots can be uniformly or heterogeneously dispersed within the glass. The quantum dots can be dispersed throughout the glass, or dispersed within a certain portion of the glass. The quantum dots can be dispersed within pores that are within the glass, such as uniformly dispersed within pores in the glass.

The quantum dots can be doped (e.g., dispersed) in a surface layer of the glass. The surface layer of the glass can have any suitable thickness, such as a thickness of 1 micron to 2000 microns, or 5 microns to 1000 microns, or less than or equal to 2000 microns but greater than or equal to 1 micron, 2, 3, 4, 5, 6, 8, 10, 12, 14, 16, 18, 20, 25, 50, 75, 100, 150, 200, 250, 500, 750, 1000, 1250, 1500, or 1750 microns. The quantum dots can have any suitable concentration profile within the surface layer. The quantum dots can have a uniform concentration throughout the surface layer. The quantum dots can have a gradient concentration within the surface layer (e.g., decreasing concentration with increasing distance away from the exterior surface of the glass).

The quantum dots can be doped into the glass such that washing of the quantum dot-doped glass with an organic solvent is not sufficient to wash the quantum dots out of the glass. For example, washing of the quantum dot-doped glass with toluene can be insufficient to wash the quantum dots out of the quantum dot-doped glass.

The quantum dots can form any suitable proportion of the quantum dot-doped glass. For example, the quantum dots can be 0.0001 wt % to 5 wt % of the quantum dot-doped glass, or 0.001 wt % to 1 wt % of the quantum dot-doped glass, or less than or equal to 5 wt % and greater than or equal to 0.0001 wt %, for example 0.0005, 0.001, 0.005, 0.01, 0.05, 0.1, 0.5, 1, 1.5, 2, 2.5, 3, 3.5, 4, or 4.5 wt % of the quantum dot-doped glass.

The quantum dots of the quantum dot-doped glass can be in pores in the glass. The pores can have a greater diameter than the quantum dots that are doped in the glass. The glass can include pores having any suitable pore size, such as a pore size of 1 nm to 50 nm, 1 nm to 20 nm, 1 nm to 10 nm, 2 nm to 20 nm, 2 nm to 10 nm, 4 nm to 10 nm, or less than or equal to 50 nm and greater than or equal to 1 nm, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 nm.

The glass can be any suitable type of glass, such as a type of porous glass. The glass can be a porous borosilicate glass. The borosilicate glass can include silica and boron trioxide. The borosilicate glass can further include sodium oxide, aluminum oxide, or a combination thereof. The borosilicate glass can be glass that has been treated to dissolved and/or extract a phase from the glass to form pores in the glass. In various examples, the borosilicate glass can include 50-98 wt % silica, or 60-98 wt %, or 65-80 wt %, or 80-98 wt %, or 90-98 wt %, or less than or equal to 98 wt % and greater than or equal to 50 wt %, 55, 60, 65, 66, 67.5, 70, 72.5, 74%, 75%, 75, 80, 82, 84, 86, 88, 90, 91, 92, 93, 94, 95, 96, or 97 wt % silica. The borosilicate glass can include 1-50 wt % boron trioxide, or 1-40 wt %, or 1-20%, or 1-10%, or less than or equal to 50 wt % and greater than or equal to 1 wt %, 2, 3, 4, 5, 6, 7, 8, 9, 10, 12, 14, 16, 18, 20, 25, 30, 35, 40, or 45 wt %. In some embodiments the borosilicate glass can include 25 to 50 wt % boron trioxide. The borosilicate glass can include 0.01-20 wt % aluminum oxide, sodium oxide, or a combination thereof, or 0.01-10 wt %, or 0.01-5 wt %, or equal to or less than 20 wt % and greater than or equal to 0.01 wt %, 0.05, 0.1, 0.2, 0.3, 0.4, 0.5, 0.6, 0.7, 0.8, 0.9, 1, 1.2, 1.4, 1.6, 1.8, 2, 3, 4, 5, 6, or 8 wt % aluminum oxide, sodium oxide, or a combination thereof. %. In some embodiments the borosilicate glass can include 0.01 to 10 wt % wt % (e.g., 0.5 to 10 wt %) aluminum oxide, sodium oxide, or a combination thereof. The glass may also contain 0.01-1 wt % of other components, for example 0.01-1 wt % of $SnO_2$, $K_2O$, $Fe_2O_3$, CaO, or a combination thereof. In some embodiments the glass contains 0.01-0.5 wt % of other components, for example 0.01-0.2 wt % of $SnO_2$, $K_2O$, $Fe_2O_3$, CaO, or a combination thereof.

The glass can be, for example, Vycor® glass, manufactured by Corning Inc. of Corning, NY. The glass can include an alkali-borosilicate glass that has been phase separated and has had the resulting alkali- and boric acid-rich phase dissolved in acid without subsequent melting to consolidate pores thereof. Generally, VYCOR® starts as an alkali borosilicate glass that is put through processing steps to transform the alkali borosilicate glass into a silica rich structure. The VYCOR® product and a glass precursor are described in Corning Inc.'s U.S. Pat. No. 2,106,744 (the '744 patent), which is hereby incorporated by reference in its entirety. As disclosed therein, glass compositions in a certain region of the ternary system $R_2O/B_2O_3/SiO_2$ will, on the proper heat treatment, separate into two phases. One of the phases is very rich in silica, whereas the other phase is very rich in alkali and boric oxide which is then acid dissolved or sol-gel extracted to form the porous glass.

For the borosilicate glass to be leachable by water, it is preferred that the borosilicate glass include less than 74% wt % silica, for example the borosilicate glass can include 50-74 wt % silica, 60-74 wt %, or 60-72 wt %, or 63-70 wt %, or for example 63, 64, 65, 66, 67, 68, 69, or 70 wt %, silica. The borosilicate glass can include 5 to 40 wt % boron trioxide, or 5-40 wt %, or 5-35%, or 10-35% wt % or 15-35 wt %, or 20-35 wt %. For example, in some embodiments the borosilicate glass includes 22 wt % to 32 wt % boron trioxide. In some embodiments the borosilicate glass can include 24 wt % o 32 wt % boron. The borosilicate glass that is water leachable can include, for example, 0.01-20 wt % (e.g., 5 to 15 wt %, 8 to 12 wt %) aluminum oxide, sodium oxide, or a combination thereof, or 0.01-10 wt %, or 0.01-5 wt %, or equal to or less than 20 wt % and greater than or equal to 0.01 wt %. For example, the glass may contain 0.05, 0.1, 0.2, 0.3, 0.4, 0.5, 0.6, 0.7, 0.8, 0.9, 1, 1.2, 1.4, 1.6, 1.8, 2, 3, 4, 5, 6, 8, 8.5, or 9 wt % of aluminum oxide, sodium oxide, or a combination thereof. In some embodiments the borosilicate glass includes 0.01 to 10 wt % aluminum oxide, sodium oxide, or a combination thereof. In some embodiments the borosilicate glass includes 0.01 to 9 wt % aluminum oxide, sodium oxide, or a combination thereof. The glass may also contain 0.01-1 wt % of other components, for example 0.01-1 wt % of $SnO_2$, $K_2O$, $Fe_2O_3$, CaO, or a combination thereof. In some embodiments the glass contains 0.01-0.5 wt % of other components, for example 0.01-0.2 wt % of $SnO_2$, $K_2O$, $Fe_2O_3$, CaO, or a combination thereof.

The glass can have a porosity of about 1% to 40%, 10% to 40%, or 20% to 35%, or 25% to 30%, or less than or equal to 40 wt % and greater than or equal to 1%, 2, 4, 6, 8, 10, 12, 14, 16, 18, 20, 21, 22, 23, 24, 25, 26, 27, 28, 29, 30, 31, 32, 33, 34, 35, 36, or 38%. The glass can have a surface area of 100 $m^2$/g to 400 $m^2$/g, or 150 $m^2$/g to 300 $m^2$/g, or 175 $m^2$/g to 250 $m^2$/g, or less than or equal to 400 $m^2$/g and greater than or equal to 100 $m^2$/g, 120, 140, 160, 180, 200, 220, 240, 260, 280, 300, 320, 340, 360, or 380 $m^2$/g. The glass can be formed using any suitable phase separation temperature, such as a phase separation temperature of 500° C. to 700° C., or 560° C. to 600° C., or less than or equal to 700° C. and greater than or equal to 500° C., 520, 540, 560, 580, 600, 620, 640, 660, or 680° C. The porous glass can be formed using any suitable glass leaching time, such as a time of 18 hours to 30 days, or less than or equal to 30 days and greater than or equal to 20 days, and is leached by HF free materials, for example water ($H_2O$), or $HNO_3$ acid. For example, the glass may be leached by the $HNO_3$ aciacid for at least 5 days (e.g., 6, 8, 10, 12, 14, 16, 18, 20, 22, 24, 26, or 28 days). Water leaching may be utilized, for example, for 16-30 hours.

As described above, the quantum dot-doped glass can be a modified glass, such as modified via one or more surface treatments prior to doping with the quantum dots. According to the disclosed embodiments HF acid is not utilized in the glass modification/pore forming step, advantageously eliminating toxicity associated with the HF process (i.e., it is preferable that the glass modification step is HF free). For example, the glass can be modified/leached with $H_2SO_4$, $HNO_3$, HCl, H3PO$_4$, $H_2O$, citric acid, acetic acid, or combinations thereof prior to the treatment with the solution comprising the quantum dots, in order to provide the desired glass porosity.

According to one embodiment the borosilica glass can be $HNO_3$ acid modified (and no HF is used). The $HNO_3$ acid-modification can include modification of the internal surface of the glass (e.g., the internal structure of pores of the glass that have access to the exterior of the glass) with $HNO_3$ having a concentration of 0.01 wt % to 10 wt % in water, for example 0.1 wt % to 1 wt %, or less than or equal to 10 wt % and greater than or equal to 0.01 wt %, 0.1, 1, 2, 3, 4, 5, 6, 7, 8, or 9 wt %. The $HNO_3$ acid modification/treatment can be performed for any suitable duration, such as a duration of 3 days to 30 days, preferably at temperatures of 95-100° C.

According to another embodiment the glass can be modified by $H_2O$ leaching treatment. The $H_2O$ glass modification (no HF added) can include modification of the internal surface of the glass (e.g., the internal structure of pores of the glass that have access to the exterior of the glass) The $H_2O$-modification can be performed for any suitable duration, such as a duration of 12 hours to 72 hours, 12 hours to 72 hours, or less than or equal to 64 hours but greater than or equal to 16 hours, where water is preferably at at least 90° C. (e.g., 90° C.-130° ° C., or 90° C.-100° C.).

Thus, prior to the treatment with the solution comprising the quantum dots, the glass can be modified or leached, for example by utilizing $H_2SO_4$, $HNO_3$, HCl, $H_3PO_4$, $H_2O$, or combinations thereof.

Prior to doping, the quantum dots can be modified with a surface-modifying material that reduces surface defects in the quantum dot, changes surface chemistry of the quantum dot, and/or increases quantum yield of the quantum dots doped in the glass. For example, the quantum dots can be modified prior to doping by a surface-modifying material including $I_2$, $Br_2$, $Cl_2$, an alkyl-carboxylate acid, an alkyl amine, an alkyl thiol, a metal alkyl-carboxylate complex, or a combination thereof.

The quantum dot-doped glass can be annealed after modification, such as annealed after treatment with the Si—OH-reducing material. The annealing can be any suitable annealing. The annealing can be performed in any suitable atmosphere; for example, the annealing can be performed in air, vacuum, or inert gas. The annealing can include annealing at 300° C. to 800° C., or 550° C. to 650° C., or less than or equal to 800° C. and greater than or equal to 300° C., 350, 400, 450, 500, 550, 600, 650, 700, or 750° C. The annealing can be performed for 1 min to 8 h, or 30 min to 2 h, or less than or equal to 8 h and greater than or equal to 1 min, 30 min, 1 h, 2, 3, 4, 5, 6, or 7 h.

The quantum dots can be any suitable one or more type of quantum dots. The quantum dots can include a single type of quantum dot, or the quantum dots can include more than one type of quantum dots. The quantum dots can have a diameter (e.g., D50) of 1 nm to 50 nm, or 2 nm to 20 nm, or less than or equal to 50 nm and greater than or equal to 1 nm, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 nm. The quantum dot can include any suitable material, such as ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$ alloys thereof, core/shell structures of any combination thereof, or combinations thereof. In various aspects, the quantum dots can include core-shell quantum dots (e.g., quantum dots including a core with a shell that encompasses the core), wherein the core and the shell can independently include ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$ alloys thereof, or combinations thereof. The quantum dots can include CdSe. The quantum dots can include ZnS. The quantum dots can include CdSe/ZnS core/shell quantum dots.

The quantum dots in the quantum dot-doped glass can be sealed within the glass (e.g., within pores in a surface layer of the glass). The quantum dots can be sealed within the glass via one or more layers of optically transparent material. The one or more layers of optically transparent material can have any suitable thickness, such as a thickness of 1 nm to 1500 nm, 5 nm to 1000 nm, 5 nm to 10 nm, or less than or equal to 1500 nm and greater than or equal to 1 nm, 2, 3, 4, 5, 6, 7, 8, 9, 10, 12, 14, 16, 18, 20, 22, 24, 26, 28, 30, 35, 40, 45, 50, 75, 100, 150, 200, 250, 500, 750, 1000, or 1250 nm. The one or more layers of optically transparent material can include a layer including $Al_2O_3$, $SiO_2$, $Si_3N_4$, or a combination thereof. The one or more layers of optically transparent material can be deposited on the glass via any suitable technique, such as atomic layer deposition. The one or more layers of optically transparent material can include a PVD- or PECVD-deposited layer having a thickness of 100 nm to 1000 nm. The one or more layers of optically transparent material can include a layer adjacent to the glass including $Al_2O_3$, $SiO_2$, $Si_3N_4$, or a combination thereof, that has a thickness of 5-10 nm, and a PVD- or PECVD-deposited layer thereon having a thickness of 100 nm to 1000 nm.

Method of Forming a Quantum Dot-Doped Glass

In various aspects the present invention provides a method of making the quantum dot-doped glass described herein. The method can be any suitable method that forms the quantum dot-doped glass described herein. For example, the method can include treating a glass (e.g., a porous glass) with a solution including quantum dots to form a quantum dot-doped glass. The quantum dot-doped glass includes glass that includes quantum dots in an internal structure of the glass. The quantum dots within the glass can have a photoluminescence quantum yield of ≥10%.

The treating of the glass with the solution including the quantum dots can be any suitable treating that dopes the quantum dots into an internal structure of the glass. The treating can include treating at any suitable temperature, such as 0° C. to 100° C., or 10° C. to 30° C., or room temperature, or less than or equal to 100° C. and greater than or equal to 0° C., 10, 15, 20, 25, 30, 35, 40, 50, 60, 70, 80, or 90° C. The treating can include soaking the glass in the solution. The soaking can be performed for any suitable duration, such as for a duration of 1 h to 1 week, or 24 h to 120 h, or less than or equal to 1 week and greater than or equal to 1 h, 2, 3, 4, 5 h, 6 h, 7 h, 8 h, 9 h, 10 h, 11 h, 12 h, 14 h, 16 h, 18 h, 20 h, 22 h, 1 day, 1.5 days, 2 days, 2.5 days, 3 days, 4 days, 5 days, or 6 d. After the soaking, the method can include rinsing the treated glass with an organic solvent, such as a non-polar organic solvent, such as toluene.

The solution can include an organic solvent. The organic solvent can be any suitable organic solvent, such as a non-polar organic solvent. In various aspects, the solution includes toluene. The solution can have any suitable concentration of the quantum dots, such as a concentration of 0.01 mg/mL to 5 mg/mL, 0.1 mg/mL to 1 mg/mL, or less than or equal to 5 mg/mL and greater than or equal to 0.01 mg/mL, 0.05, 0.1, 0.5, 1, 1.5, 2, 2.5, 3, 3.5, 4, or 4.5 mg/mL.

The method can further include drying the treated glass. The drying can be any suitable drying that removes solvent from the treated glass. The drying can include drying under vacuum at room temperature.

The glass that is treated to form the quantum dot-doped glass can be any suitable type of glass, such as a type of porous glass. The glass can be a porous borosilicate glass. According to some embodiments, the glass comprises: 360 to 80 mole % $SiO_2$; 0 to 12 mole % $Na_2O$, and 20 to 35 mole % $B_2O_3$. According to some embodiments, the glass comprises: 64 to 78 mole % $SiO_2$; 0 to 9 mole % $Na_2O$, and 20 to 32 mole % $B_2O_3$.

According to some embodiments, the glass comprises: 64 to 75 mole % $SiO_2$; 3 to 10 mole % $Na_2O$, and 20 to 30 mole % $B_2O_3$. According to some embodiments, the glass comprises: 60 to 70 mole % $SiO_2$; 5 to 12 mole % $Na_2O$, and 20 to 30 mole % $B_2O_3$. According to some embodiments, the glass comprises: 60 to 70 mole % $SiO_2$; 7 to 10 mole % $Na_2O$, and 20 to 30 mole % $B_2O_3$.

Some exemplary glass compositions are provided in Tables 1A and 1B, below

TABLE 1A

| Glass wt % | Vycor | Modified Vycor* | Example 1 | Example 2 | Example 3 | Example 4 | Example 5 |
|---|---|---|---|---|---|---|---|
| SiO2 | 72.58 | 72.58 | 67.23 | 63.31 | 62.92 | 60.51 | 66.37 |
| B2O3 | 22.43 | 22.43 | 27.82 | 27.79 | 33.14 | 26.56 | 29.13 |
| Al2O3 | 0 | 0 | 0 | 0 | 0 | 0 | 0 |
| P2O5 | 0 | 0 | 0 | 0 | 0 | 0 | 0 |

TABLE 1A-continued

| Glass wt % | Vycor | Modified Vycor* | Example 1 | Example 2 | Example 3 | Example 4 | Example 5 |
|---|---|---|---|---|---|---|---|
| Li2O | 0 | 0 | 0 | 0 | 0 | 0 | 4.50 |
| Na2O | 4.99 | 4.99 | 4.95 | 8.91 | 3.93 | 0 | 0 |
| K2O | 0 | 0 | 0 | 0 | 0 | 12.94 | 0 |
| SnO2 | | | | | | | |

*Different annealing conditions, but the same composition as Vycor

TABLE 1B

| mol % | Vycor | Modified Vycor* | Example 1 | Example 2 | Example 3 | Example 4 | Example 5 |
|---|---|---|---|---|---|---|---|
| SiO2 | 75.00 | 75.00 | 70.00 | 66.00 | 66.00 | 66.00 | 66.00 |
| B2O3 | 20 | 20 | 25 | 25 | 30 | 25 | 25 |
| Li2O | | | | | | | 9 |
| Na2O | 5 | 5 | 5 | 9 | 4 | | |
| K2O | | | | | | 9 | |
| SnO2 | | | | | | | |
| Total | | | | | | | |

*Different annealing conditions, but the same composition as Vycor

As stated above, the glass can be, for example, Vycor® glass or a glass with Vycor modified composition. The glass can include an (e.g., through annealing or other phase separation methods) and has had the resulting alkali- and boric acid-rich phase dissolved in acid or water without subsequent melting to consolidate pores thereof. The glass can have a porosity of about 1% to 40%, 10% to 40%, or 20% to 35%, or 25% to 30%, or less than or equal to 40 wt % and greater than or equal to 1%, 2, 4, 6, 8, 10, 12, 14, 16, 18, 20, 21, 22, 23, 24, 25, 26, 27, 28, 29, 30, 31, 32, 33, 34, 35, 36, or 38%. The glass can have a surface area of 100 m2/g to 400 m2/g, or 150 m2/g to 300 m2/g, or 175 m2/g to 250 m2/g, or less than or equal to 400 m2/g and greater than or equal to 100 m2/g, 120, 140, 160, 180, 200, 220, 240, 260, 280, 300, 320, 340, 360, or 380 m2/g. The glass can be formed using any suitable phase separation (or annealing) temperature, such as a phase separation temperature of 500° C. to 700° C., or 560° C. to 600° C., or less than or equal to 700° C. and greater than or equal to 500° C., 520° C., 540° C., 560° C., 580° C., 600° C., 620° C., 640° C., 660° C., or 680° C. The glass can be formed modified using any suitable leaching time, such as a time of 12 hours to 30 days, or less than or equal to 30 days and greater than or equal to 1 day, 3 days, 4, 6, 8, 10, 12, 14, 16, 18, 20, 22, 24, 26, or 28 days.

The glass that is treated to form the quantum dot-doped glass can be a modified glass, such as modified via one or more surface treatments without the use HF. For example, prior treating the glass with the solution including the quantum dots, the glass used to form the quantum dot-doped glass can instead be modified with $NH_3$, $H_2SO_4$, $HNO_3$, HCl, $H_3PO_4$, citric acid, acetic acid, $H_2O$, or combinations thereof.

Prior to treating the glass with the solution including the quantum dots, the quantum dots can be modified with a surface-modifying material that reduces surface defects in the quantum dot, changes surface chemistry of the quantum dot, and/or increases quantum yield of the quantum dots doped in the glass. For example, the quantum dots can be modified prior to doping by a surface-modifying material including $I_2$, $Br_2$, $Cl_2$, an alkyl-carboxylate acid, an alkyl amine, an alkyl thiol, a metal alkyl-carboxylate complex, or a combination thereof.

The glass used to form the quantum dot-doped glass can be annealed after modification, such as annealed after treatment with Si—OH-reducing material and before performing the treatment of the glass with the solution including the quantum dots. The annealing can be any suitable annealing. The annealing can be performed in any suitable atmosphere; for example, the annealing can be performed in air, vacuum, or inert gas. The annealing can include annealing at 300° C. to 800° C., or 550° C. to 650° C., or less than or equal to 800° C. and greater than or equal to 300° C., 350, 400, 450, 500, 550, 600, 650, 700, or 750° C. The annealing can be performed for 1 min to 8 h, or 30 min to 2 h, or less than or equal to 8 h and greater than or equal to 1 min, 30 min, 1 h, 2, 3, 4, 5, 6, or 7 h.

The quantum dots in the solution can any suitable one or more type of quantum dots. The quantum dots can include a single type of quantum dots, or the quantum dots can include more than one type of quantum dot. The quantum dots can have a diameter (e.g., D50) of 1 nm to 50 nm, or 2 nm to 20 nm, or less than or equal to 50 nm and greater than or equal to 1 nm, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 nm. The quantum dots can include any suitable material, such as ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, core/shell structures of any combination thereof, or combinations thereof. In various aspects, the quantum dots can include core-shell quantum dots (e.g., quantum dots including a core with a shell that encompasses the core), wherein the core and the shell can independently include ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, or combinations thereof. The quantum dots can include CdSe. The quantum dots can include ZnS. The quantum dots can include CdSe/ZnS core/shell quantum dots.

The method can include sealing the quantum dots within the glass (e.g., within pores in a surface layer of the glass). The quantum dots can be sealed within the glass via one or more layers of optically transparent material. The one or more layers of optically transparent material can have any suitable thickness, such as a thickness of 1 nm to 1500 nm, 5 nm to 1000 nm, 5 nm to 10 nm, or less than or equal to 1500 nm and greater than or equal to 1 nm, 2, 3, 4, 5, 6, 7, 8, 9, 10, 12, 14, 16, 18, 20, 22, 24, 26, 28, 30, 35, 40, 45, 50, 75, 100, 150, 200, 250, 500, 750, 1000, or 1250 nm. The one or more layers of optically transparent material can include a layer including $Al_2O_3$, $SiO_2$, $Si_3N_4$, or a combination thereof. The method can include depositing the one or more layers of optically transparent material on the glass via any suitable technique, such as atomic layer deposition. The method can include depositing a PVD- or PECVD-deposited optically transparent layer having a thickness of 100 nm to 1000 nm. The method can include depositing a layer adjacent to the glass including $Al_2O_3$, $SiO_2$, $Si_3N_4$, or a combination thereof, that has a thickness of 5-10 nm, and PVD- or PECVD-depositing a layer thereon having a thickness of 100 nm to 1000 nm.

It is noted that the same embodiment glass that was leached according to the embodiments described herein have Al levels of >0.1 wt %, and Zn levels of greater than 0.04 wt %. When a similar glass was treated with HF, the surface levels of Al and Zn dropped significantly below these levels. For example, we performed XRF composition analysis on two glasses samples. They were a comparative glass sample of "HF treated Vycor" and an exemplary embodiment glass sample (Vycor_28 days leaching with $HNO_3$ as described below, no HF treatment). The XRF results are listed below. The results are reported in wt % element. The balance is everything not measured, e.g., B, F, Na and O. Table 1C below shows that the embodiment of the Vycor glass sample that was leached without HF treatment has greater levels of Al and Zn than the comparative sample of Vycor glass that treated with HF.

TABLE 1C

| XRM glass composition analysis | | | | | | |
|---|---|---|---|---|---|---|
| Glass Sample | Al | Cl | Nb | Si | Zn | Bal |
| Vycor no HF treatment | 0.153 | 0 | 0.001 | 47.546 | 0.041 | 52.259 |
| Vycor wafter after HF treatment | 0 | 0.004 | 0 | 47.335 | 0.002 | 52.66 |

The analysis of HF and non-HF treated samples indicated that surface/subsurface F concentration is much higher (e.g., at least 5×, 10×, 15×, 20×, or more) in the HF treated glass sample(s) than in the non HF treated sample(s). For example, the HF treated glass surface(s) may have a fluorine levels of between 0.8 mole % and 1 mole % (e.g., 0.25 wt % to 0.31 wt %), and may be 10× to about 100× higher than the fluorine at or near the surface in the non-HF treated glass sample. The non-HF treated glass surface(s) may have a low level of fluorine such as 0 to 0.2 wt %, 0 to 0.15 wt %, or 0 to 0.1 wt %, 0 to 0.075 wt %, 0 to 0.05 wt %, or even 0 to 0.01 wt %), and may be 10× to about 100× lower than the fluorine at or near the surface in the HF-treated sample. When calculated in mole %, the non-HF treated glass surface(s) may have less than 0.7 mole % F, for example 0 to 0.5 mole % of F, 0 to 0.25 mole % F, 0 to 0.1 mole % F, 0 to 0.05 mole % F, or even 0 to 0.01 mole %).

For example, the amount of fluorine in a glass that has not been treated with HF may be 0 to 0.2 wt %, 0 to 0.1 wt %, 0 to 0.05 wt %, 0 to 0.025 wt %, 0 to 0.01 wt %, 0 to 0.005 wt %, or 0.0001 to 0.2 wt %, 0.001 to 0.1 wt %, 0.001 to 0.05 wt %, 0.001 to 0.025 wt %, 0.001 to 0.01 wt %, 0.001 to 0.005 wt %, 0.001% to 0.003 wt %, or 0 to 0.0025 wt %, or 0 to 0.0015 wt %. That is, HF treatment results in a fluorine enriched surface layer, with fluorine concentration much higher (e.g., 5, 10, 20, 50, or 100, or more times higher) than the concentration of the fluorine present in the original (green) glass material.

Figure 1B:
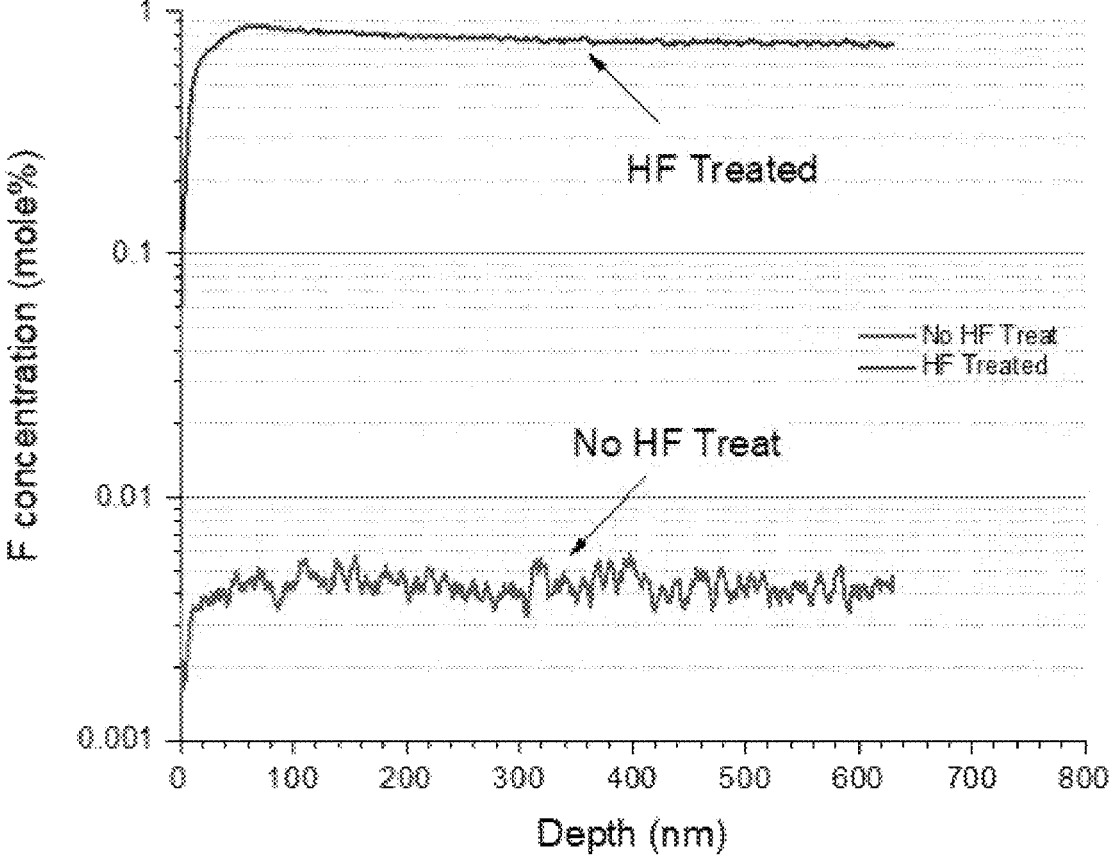
FIG. 1B illustrates amounts of F detected by the SIMS analysis at the surface layers (0-600 nm deep) of the samples corresponding to an exemplary embodiment and a comparative example (HF treated) glass.

FIG. 1A illustrates relative amounts of F detected by the dynamic SIMS (Secondary Ion Mass Spectroscopy) analysis at the surface layer (0-600 nm deep) of the sample glass corresponding to an embodiment described herein and the comparative glass sample treated with HF. The vertical axis is height of normalized signal emitted by the presence of F. The horizontal axis specifies the depth of the layer where the measurement took place. More specifically, FIG. 1A shows that Fluorine is about ~100× elevated in the comparative HF treated sample Vicor, relative to the "No HF Treatment" Vicor sample which only has insignificant F trace amounts. The amount of F on the surface of the comparative sample glass is greater than 0.25 wt %. More specifically, as shown in FIG. 1B the amount of F on the surface of the comparative sample glass is about 1 mole %. However, the amount of F in the glass on the surface of the exemplary embodiment glass of FIG. 1B is less than 0.7 mole %, less than 0.65 mole %, less than 0.03 mole %, less than 0.025 mole %, less than 0.02 mole %, and even less than 0.015 mole %, for example between 0 and 0.015 mole %, or even between 0 and 0.0015 mole %.

In terms of wt %, the amount of F in the glass on the surface of the exemplary embodiment of QD doped glass of FIG. 1B is less than 0.2 wt %, less than 0.1 wt %, less than 0.05 wt %, less than 0.02 wt %, less than 0.015 wt % (less than 0.0465 mole %), less than 0.01 wt %, less than 0.005 wt %, with typical values being between 0 and 0.015 wt %.

In some embodiments the amount of F on the surface of the QD doped glass is between 0.00 wt % and 0.012 wt %, or even between 0.00 wt % and 0.0015 wt %. More specifically, in the embodiment shown in FIG. 1B the amount of F in the QD doped glass is about 0.004 mole % or about 0.0012 wt %.

Figure 1C:
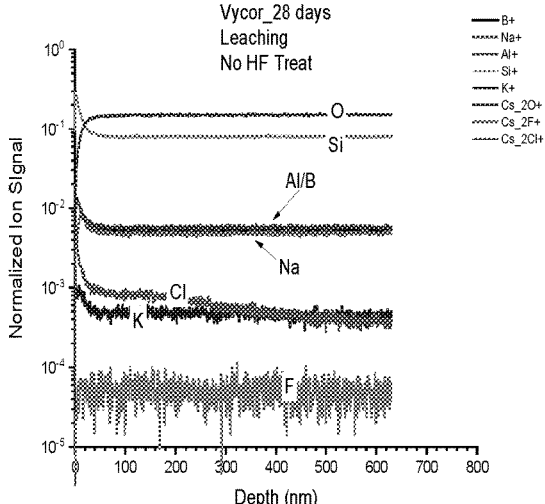
FIG. 1C illustrates amounts of Na, K, and Cl detected by the SIMS analysis at the surface layers (0-600 nm deep) of the samples corresponding to an exemplary embodiment and a comparative example (HF treated) glass.
Figure 1C:
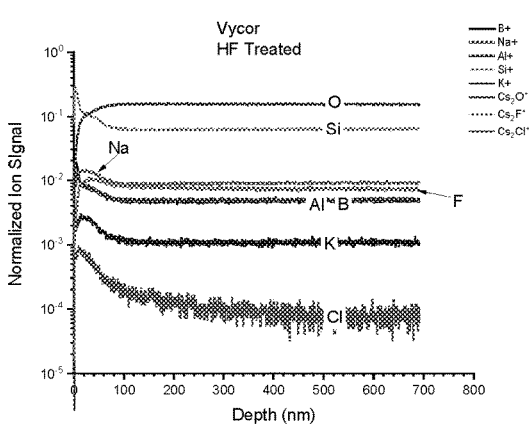

The apparent concentration of Na, K, and Cl is also slightly different in the HF Treated sample. FIG. 1C illustrates the amounts of Na, K, and Cl detected by the dynamic SIMS (Secondary Ion Mass Spectroscopy) analysis at the surface layer (0-600 nm deep) of the comparative sample glass and the comparative sample. The vertical axis is height of normalized signal emitted by the presence of Na, K, and Cl. The horizontal axis specifies the depth of the layer where the measurement took place. FIG. 1C indicates, for example, that in 0-100 nm surface layer, the amount of K is lower in the exemplary embodiment than that in in 0-100 nm surface layer of HF treated glass of the comparative sample glass, while the amount of Cl is significantly higher in the exemplary embodiment than that in HF treated glass. The amount of Na is also higher at 0-75 nm deep surface layer in the exemplary embodiment than that in HF treated glass. (Cs cluster ions were used to monitor electronegative species during SIMS analysis. Cs is present from implantation of primary ions (sputter beam)).

EXAMPLES

Various aspects of the present invention can be better understood by reference to the following Examples which are offered by way of illustration. The present invention is not limited to the Examples given herein.

Porous glass (e.g., porous Vycor glass) is an ideal host material for nanoparticles in optical applications. It is transparent from visible to near infrared with an average pore size of less than 10 nm. In one embodiment the glass porosity was produced by leaching $B_2O_3/Na_2O$ phase for 28 days in 1M (i.e., 6.3 wt %) $HNO_3$ acid mixed with cabosil at 95° C. The porous Vycor glass was then rinsed in 95° C. water and annealed in air at 600° C. for 1 hour before loading QDs. Vycor glass used in this embodiment has 5-10 nm pores in a 10 μm thick surface layer and the interior pore size is 5-10 nm. The pore size and its distribution could be tuned during glass preparation by varying experimental conditions such as phase-separation temperature and acid or water leaching time.

Figure 2:
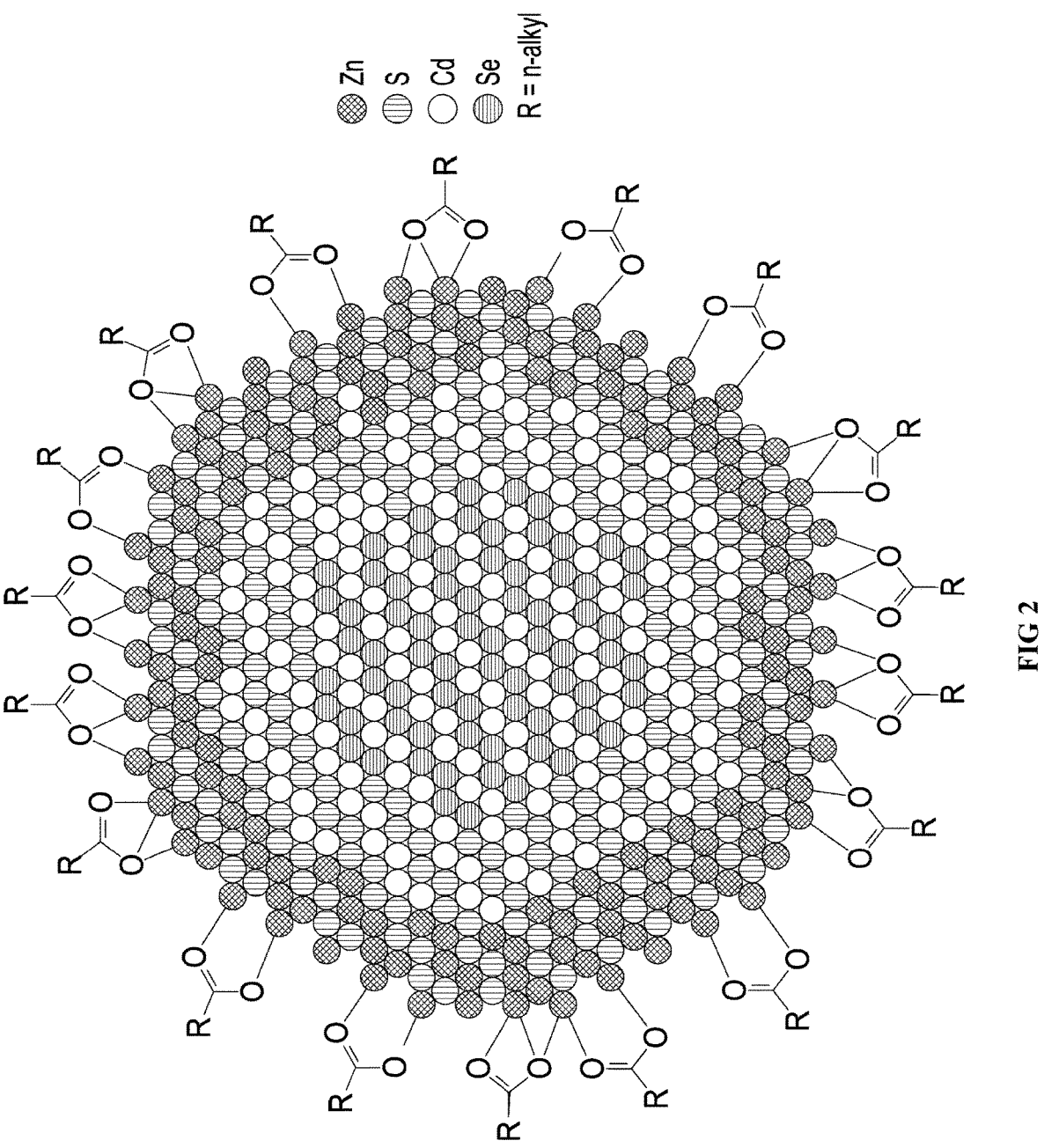
FIG. 2 illustrates a schematic of a CdSe/CdS/ZnS core/shell QD with alkyl-carboxylate surfactant ligands on its surface.

The surface of colloidal quantum dots can be passivated by a layer of organic surfactant ligands. One example is shown in (FIG. 2), which illustrates a schematic of a CdSe/CdS/ZnS core/shell QD with alkyl-carboxylate surfactant ligands on its surface. When surfactants are anionic ligands such as carboxylate, the QD surface is metal-enriched. The carboxylate ligands bond to surface metal atoms to balance charge and passivate surface terminate bonds. The solubility of colloidal QDs in solvents also comes from surfactant ligands.

These surfactant ligands play an important role in synthesis to control quantum dots growth/shapes/size-distribution, and also enable the dispersion of quantum dots into organic solvents for solution-processing. Moreover, the "electronic" passivation of QD's surface dangling bonds by surfactant ligands is crucial for eliminating carrier traps and enhancing PL emissions. The most commonly used surfactant ligands are bulky alkyl molecules (C8-C18) with coordinating functional groups (such as —COOH, —$NH_2$, and the like). They bond to metal-enriched QDs surface to balance charges and provide steric protection. However, surfactant ligands and metal-surfactant complexes can be stripped off by coordinating chemicals (such as acid, H2O, alcohol, and the like), which generates carrier traps and quenches PL emissions. This has been found to be a big challenge when incorporating QDs into matrix materials.

Vycor glass has a ~200 m2/g internal surface which is covered by Si—OH terminal groups. H2O is also present due to the hydrophilic surface. Both Si—OH groups and H2O molecules can deteriorate QDs surface passivation by dissociating surfactant ligands. In this embodiment, we modify the Vycor glass internal surface to improve the PL QY of loaded QDs.

Figure 3A:
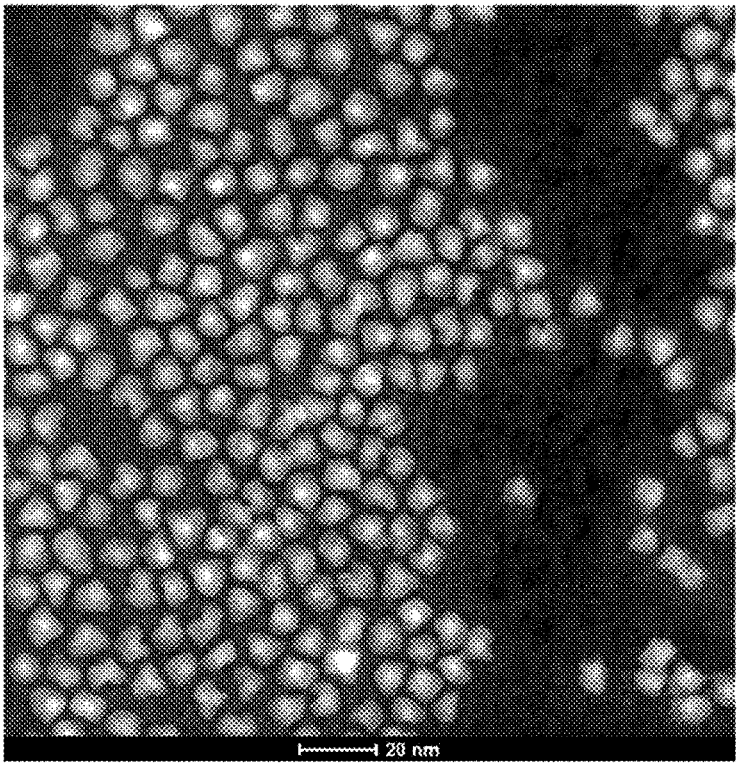
FIGS. 3A-B illustrate TEM images of colloidal CdSe/ZnS core/shell QDs.
Figure 3B:
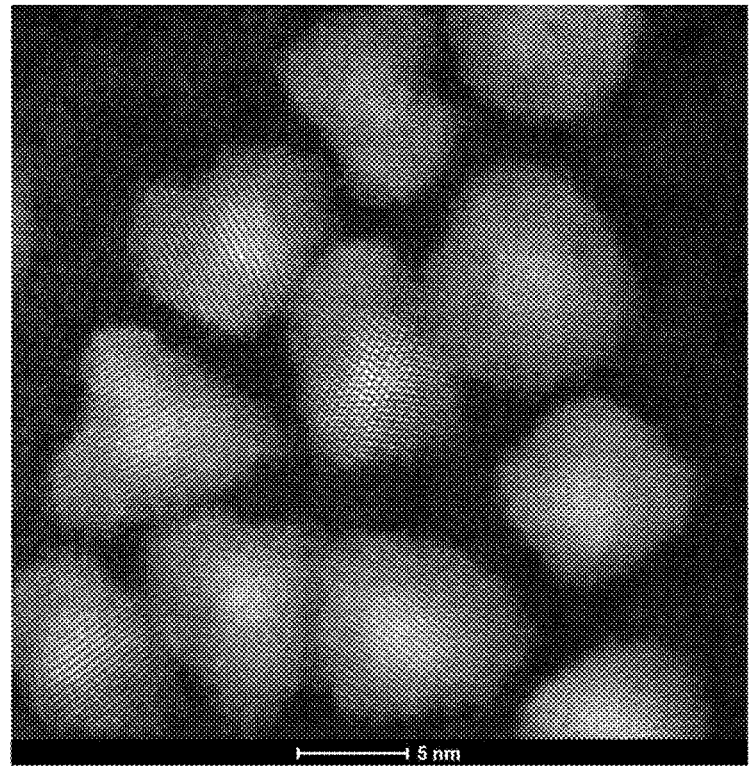

CdSe/ZnS core/shell QDs were used in our test. The QDs included a ~2 nm diameter CdSe core and a ~1.5 nm thick ZnS shell. FIGS. 3A-B illustrate TEM images of the colloidal CdSe/ZnS core/shell QDs. The QDs are the brighter spots in the TEM images. In such a core/shell structure, a secondary semiconductor (shell, with larger band gap) is grown on the "core" dot to improve surface passivation. But the "shell" is very thin (less than 2 nm thick) and cannot completely cover the core dot. Therefore, PL emission of core/shell QDs remains sensitive to the surface passivation.

CdSe/ZnS QDs were impregnated into Vycor glass via a solution method. Before loading QDs, as described above, the Vycor glass (1 mm thick) was rinsed in water and annealed in air at 600° C. for 1 hour. The glass was then soaked in a CdSe/ZnS QDs toluene solution (1 mg/mL) for 72 hours, followed by rinsing in pure toluene and drying under vacuum. QDs were dispersed inside Vycor glass within a ~10 μm thick surface layer. The pores of the Vycor glass were larger than the QDs. The concentration of the QDs gradually decreased from glass surface to the interior. The loaded QDs could not be washed out by rinsing in toluene solvent, which indicated that the QDs had strong interactions with Vycor internal surface. The loading concentration of the QDs (over the whole glass) was estimated to be about 0.02% (in weight; porous Vycor glass).

Figure 4:
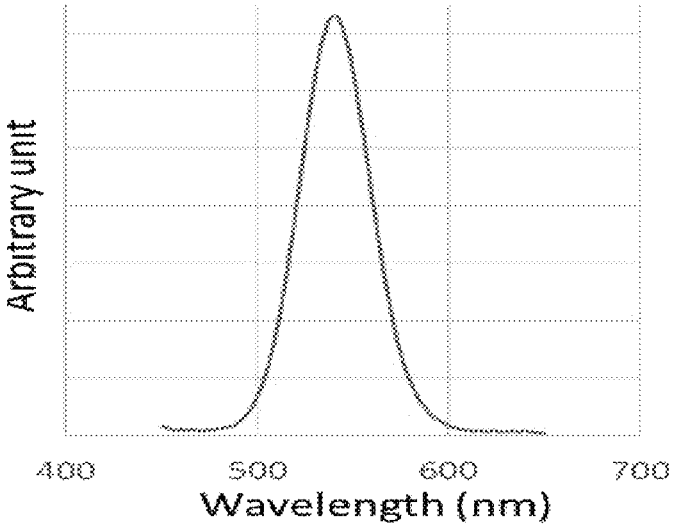
FIG. 4 illustrates photoluminescence spectra of colloidal CdSe/ZnS core/shell QDs according to one or more embodiments described herein.

QDs inside Vycor glass showed the same characteristic photoluminescence (PL) emission (wavelength, spectrum width) as pristine QDs, but the emission efficiency was sensitive to Vycor glass internal surface. FIG. 4 illustrates photoluminescence spectra of CdSe/ZnS QDs used in this work. The PL quantum yield (QY) of QDs inside pristine Vycor glass is 7.5%. When QDs were loaded into $HNO_3$-treated Vycor glass, the PL QY increased to about 40%. The $HNO_3$, HF treatment must benefit QDs PL emission via modifying the internal surface of the Vycor glass. One hypothesis is that $HNO_3$ treatment removes some of surface Si—OH groups. As explained above, Si—OH groups can damage QDs surface passivation and reduce PL emission efficiency. The $HNO_3$ treatment also improved loading efficiency of the QDs. In the same impregnation experiments, the amount of loaded QDs in $HNO_3$-treated glass was several times as much as that in pristine Vycor glass, based on optical absorption. The $HNO_3$ treatment used in this work may slightly increase the pore size (although no noticeable size change was observed based on high resolution SEM images at 150K magnification). Another explanation for the improved loading efficiency could be the decrease of the surface Si—OH concentration after $HNO_3$ treatment; Si—OH groups could bond to the QD and halt its diffusion.

The PL QY of QDs in $HNO_3$-treated Vycor glass (about 40%) was higher than that of pristine QD thin films (32%). This is because QDs were well-dispersed inside Vycor glass (see FIG. 4) and had weaker inter-QD coupling than close-packed QD thin films. A possible explanation is that the inter-QD coupling can induce charge carrier diffusion between QDs and reduce PL quantum yield. The good dispersion of QDs inside Vycor glass provides opportunities to achieve PL emission efficiency comparable to that of colloidal QDs in organic solvents (>90% QY), if the surfaces of Vycor glass or loaded QDs are modified to a better status. In addition to $HNO_3$, Vycor glass surface can be modified by other chemicals such $H_2SO4$, $HNO_3$, HCl, $H_3PO_4$, and/or $H_2O$, to reduce Si—OH concentration. The surface chemistry of loaded QDs also can be modified to reduce defects density.

QDs inside pourous Vycor glass maintained constant PL QY for more than 4 weeks when kept in air. The very small pore size (<10 nm) of Vycor glass may limit the diffusion of $H_2O$ and $O_2$ from air to degrade QDs. Moreover, QDs could be optionally sealed inside Vycor glass by coating a layer of optically transparent $Al_2O_3$ or $SiO_2$ films on glass surface, for example by via atomic layer deposition (ALD). The ALD process was run under argon atmosphere and QDs were indeed permanently sealed inside Vycor glass under an air-free environment. After sealing by a 100 nm thick layer of $Al_2O_3$, QDs inside Vycor glass still showed bright emission with QY of 18%. The reduction of PL QY (quantum yield) was due to the damage of the QDs in a surface layer (about 1 micrometer) by the ALD process. The PL QY can be improved by optimizing ALD process (temperature, chemicals, and the like), and by loading QDs into a thicker layer of Vycor glass.

In another exemplary embodiment, about ~40% PL quantum yield was also achieved by loading CdSe/ZnS quantum dots into another glass (Example 2 glass) which was prepared by a green and fast leaching process. The green glass of Example 2 has slightly different composition to that of the conventional Vycor (higher $Na_2O/B_2O_3$ and lower $SiO_2$; see Table 1C, below). As a result, the porosity in Example 2 glass can be produced by H2O leaching at 95° C. for, for example, 16-90 hours. The porous layer produced by leaching in water for 24 hours is about 20 μm thick and the pore size is about 50 nm. The as-prepared porous as described above Example 2 glass was annealed in air at 600° C. for 1 hour before loading QDs. The CdSe/ZnS quantum dots were loaded into Example 2 glass by the same toluene or hexanes solution impregnation method. The PL quantum yield in Example 2 glass is greater than 40% (e.g., 40.3% after 24 hrs), which is close to that of 28 days-HNO₃ leached 1 Vycor.

TABLE 1C

The green glass compositions of Vycor and Example 2 glass

|  | Na₂O mole % | B₂O₃ mole % | SiO₂ mole % |
|---|---|---|---|
| Vycor | 5 | 20 | 75 |
| Example 2 glass | 9 | 25 | 66 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXEMPLARY ASPECTS

The following exemplary Aspects are provided, the numbering of which is not to be construed as designating levels of importance:

Aspect 1 provides a quantum dot-doped glass comprising: glass comprising quantum dots in an internal structure of the glass, wherein the quantum dots within the glass have a photoluminescence quantum yield of ≥10%.

Aspect 2 provides the quantum dot-doped glass of Aspect 1, wherein the quantum dots have a photoluminescence quantum yield of ≥20%.

Aspect 3 provides the quantum dot-doped glass of any one of Aspects 1-2, wherein the quantum dots have a photoluminescence quantum yield of ≥40%.

Aspect 4 provides the quantum dot-doped glass of any one of Aspects 1-3, wherein the quantum dots are free of aggregates of the quantum dots within the glass that have a largest dimension greater than 50 nm or that comprise more than 10 quantum dots aggregated together.

Aspect 5 provides the quantum dot-doped glass of any one of Aspects 1-4, wherein the quantum dots are doped throughout the glass or within a surface layer of the glass.

Aspect 6 provides the quantum dot-doped glass of Aspect 5, wherein the surface layer has a thickness of 1 micron to 2000 microns.

Aspect 7 provides the quantum dot-doped glass of any one of Aspects 5-6, wherein the surface layer has a thickness of 5 microns to 1000 microns.

Aspect 8 provides the quantum dot-doped glass of any one of Aspects 5-7, wherein the quantum dots have a gradient concentration within the surface layer.

Aspect 9 provides the quantum dot-doped glass of any one of Aspects 5-8, wherein the quantum dots have a concentration within the surface layer decreases with increasing depth into the glass.

Aspect 10 provides the quantum dot-doped glass of any one of Aspects 5-9, wherein the quantum dots are dispersed within the surface layer.

Aspect 11 provides the quantum dot-doped glass of any one of Aspects 1-10, wherein washing of the quantum dot-doped glass with an organic solvent is not sufficient to wash the quantum dots out of the quantum dot-doped glass.

Aspect 12 provides the quantum dot-doped glass of any one of Aspects 1-11, wherein washing of the quantum dot-doped glass with toluene is not sufficient to wash the quantum dots out of the quantum dot-doped glass.

Aspect 13 provides the quantum dot-doped glass of any one of Aspects 1-12, wherein the quantum dots are 0.0001 wt % to 5 wt % of the quantum dot-doped glass.

Aspect 14 provides the quantum dot-doped glass of any one of Aspects 1-13, wherein the quantum dots are 0.001 wt % to 1 wt % of the quantum dot-doped glass.

Aspect 15 provides the quantum dot-doped glass of any one of Aspects 1-14, wherein the quantum dots are in pores in the glass.

Aspect 16 provides the quantum dot-doped glass of any one of Aspects 1-15, wherein the glass comprises pores having a greater diameter than the quantum dots doped in the glass.

Aspect 17 provides the quantum dot-doped glass of any one of Aspects 1-16, wherein the glass comprises a pore size of 1 nm to 50 nm.

Aspect 18 provides the quantum dot-doped glass of any one of Aspects 1-17, wherein the glass comprises a pore size of 2 nm to 20 nm.

Aspect 19 provides the quantum dot-doped glass of any one of Aspects 1-18, wherein the glass comprises porous borosilicate glass.

Aspect 20 provides the quantum dot-doped glass of any one of Aspects 1-19, wherein the glass comprises an alkali-borosilicate glass that has been phase separated and has had the resulting alkali- and boric acid-rich phase dissolved in acid without subsequent melting to consolidate pores thereof.

Aspect 21 provides the quantum dot-doped glass of Aspect 20 wherein the glass comprises about 96 wt % silica and about 2-4 wt % boron trioxide.

Aspect 22 provides the quantum dot-doped glass of any one of Aspects 1-21, wherein the glass is formed using a phase separation temperature of 560° C. to 600° C.

Aspect 23 provides the quantum dot-doped glass of any one of Aspects 1-22, wherein the glass is formed without HF, using an acid-leaching time of 3 days to 30 days.

Aspect 24 provides the quantum dot-doped glass of any one of Aspects 1-22, wherein the glass is formed without HF, using water-leaching time of 16 hours to 3 days.

Aspect 25 provides the quantum dot-doped glass of any one of Aspects 23 or 248, wherein the glass is annealed after modification Aspect 26 provides the quantum dot-doped glass of Aspect 25, wherein the annealing comprises annealing in air.

Aspect 27 provides the quantum dot-doped glass of any one of Aspects 25-26, wherein the annealing comprises annealing at 300° C. to 800° C. for 1 min to 8 h.

Aspect 28 provides the quantum dot-doped glass of any one of Aspects 25-27, wherein the annealing comprises annealing at 550° C. to 650° C. for 30 min to 2 h.

Aspect 29 according to aspects 1-28 wherein the glass is modified or processed without utilizing HF.

Aspect 30 provides the quantum dot-doped glass of any one of Aspects 1-29, wherein the quantum dot is modified with a surface-modifying material that reduces surface defects in the quantum dot, changes surface chemistry of the quantum dot, and/or increases quantum yield of the quantum dots doped in the glass.

Aspect 31 provides the quantum dot-doped glass of Aspect 30, wherein the surface-modifying material comprises $I_2$, $Br_2$, $Cl_2$, an alkyl-carboxylate acid, an alkyl amine, an alkyl thiol, a metal alkyl-carboxylate complex, or a combination thereof.

Aspect 32 provides the quantum dot-doped glass of any one of Aspects 1-31, wherein the quantum dots comprise more than one type of quantum dot.

Aspect 33 provides the quantum dot-doped glass of any one of Aspects 1-32, wherein the quantum dots have a diameter of 1 nm to 50 nm.

Aspect 34 provides the quantum dot-doped glass of any one of Aspects 1-33 wherein the quantum dots have a diameter of 2 nm to 20 nm.

Aspect 35 provides the quantum dot-doped glass of any one of Aspects 1-35, wherein the quantum dots comprise ZnO, ZnS, ZnSe, ZnTe, CdS, CdSe, CdTe, HgTe, HgSe, HgS, InAs, InP, InSb, Si, C, Ge, PbS, PbSe, PbTe, CuInS₂, CsPbCl₃, CsPbBr₃, CsPbI₃, alloys thereof, core/shell structures of any combination thereof, or combinations thereof.

Aspect 36 provides the quantum dot-doped glass of any one of Aspects 1-35, wherein the quantum dots comprise core/shell quantum dots, wherein the core and the shell independently comprise ZnO, ZnS, ZnSe, ZnTe, CdS, CdSe, CdTe, HgTe, HgSe, HgS, InAs, InP, InSb, Si, C, Ge, PbS, PbSe, PbTe, CuInS₂, CsPbCl₃, CsPbBr₃, CsPbI₃, alloys thereof, or combinations thereof.

Aspect 37 provides the quantum dot-doped glass of any one of Aspects 1-36, wherein the quantum dots comprise CdSe.

Aspect 38 provides the quantum dot-doped glass of any one of Aspects 1-37, wherein the quantum dots comprise ZnS.

Aspect 39 provides the quantum dot-doped glass of any one of Aspects 1-38, wherein the quantum dots comprise CdSe/ZnS core/shell quantum dots.

Aspect 40 provides the quantum dot-doped glass of any one of Aspects 1-39, wherein the quantum dots are sealed within the glass.

Aspect 41 provides the quantum dot-doped glass of any one of Aspects 1-40, wherein the quantum dots are sealed within the glass via one or more layers of optically transparent material.

Aspect 42 provides the quantum dot-doped glass of Aspect 41, wherein the one or more layers independently comprise a thickness of 1 nm to 1500 nm.

Aspect 43 provides the quantum dot-doped glass of any one of Aspects 41-42, wherein the one or more layers independently comprise a thickness of 5 nm to 1000 nm.

Aspect 44 provides the quantum dot-doped glass of any one of Aspects 41-43, wherein the one or more layers comprise a layer comprising $Al_2O_3$, $SiO_2$, $Si_3N_4$, or a combination thereof.

Aspect 45 provides the quantum dot-doped glass of any one of Aspects 41-44, wherein the layer comprising $Al_2O_3$, $SiO_2$, $Si_3N_4$, or a combination thereof, has a thickness of 5-10 nm.

Aspect 46 provides the quantum dot-doped glass of any one of Aspects 41-45, wherein the layer comprising $Al_2O_3$, $SiO_2$, $Si_3N_4$, or a combination thereof, is deposited on the glass via a technique comprising atomic layer deposition.

Aspect 47 provides the quantum dot-doped glass of any one of Aspects 41-46, wherein the one or more layers comprises a PVD- or PECVD-deposited layer having a thickness of 100 nm to 1000 nm.

Aspect 48 provides the quantum dot-doped glass of any one of Aspects 41-47, wherein the one or more layers comprises a layer adjacent to the glass comprising $Al_2O_3$, $SiO_2$, $Si_3N_4$, or a combination thereof, that has a thickness of 5-10 nm, and a PVD- or PECVD-deposited layer thereon having a thickness of 100 nm to 1000 nm.

Aspect 49 provides a quantum dot-doped glass comprising:

porous borosilicate glass comprising a pore size of 2 nm to 20 nm, the glass comprising quantum dots dispersed in pores in a surface layer of the glass, wherein the surface layer has a thickness of 5 microns to 1000 microns, and wherein the quantum dots within the glass have a photoluminescence quantum yield of ≥10% (e.g., >20%, >30%, 40%, or therebetween).

Aspect 50 provides a method of forming the quantum dot-doped glass of any one of Aspects 1-49, the method comprising:

treating a glass with a solution comprising quantum dots to form the quantum dot-doped glass of any one of the above described Aspects.

Aspect 51 provides a method of forming a quantum dot-doped glass, the method comprising:

treating a glass with a solution comprising quantum dots to form the quantum dot-doped glass, wherein the quantum dot-doped glass comprises glass comprising quantum dots in an internal structure of the glass, wherein the quantum dots within the glass have a photoluminescence quantum yield of ≥10%.

Aspect 52 provides the method of Aspect 50 or 51, wherein the treating comprises treating at room temperature.

Aspect 53 provides the method of any one of Aspects 50-52, wherein the treating comprises soaking the glass in the solution.

Aspect 54 provides the method of any one of Aspects 50-53, wherein the treating comprises soaking the glass in the solution for a duration of 1 h to 1 week.

Aspect 55 provides the method of any one of Aspects 50-54, wherein the treating comprises soaking the glass in the solution for a duration of 24 h to 120 h.

Aspect 56 provides the method of any one of Aspects 50-55, wherein the solution comprises an organic solvent.

Aspect 62 provides the method of any one of Aspects 50-56, wherein the solution comprises toluene.

Aspect 63 provides the method of any one of Aspects 50-62, wherein the solution has a concentration of the quantum dots of 0.01 mg/mL to 5 mg/mL.

Aspect 64 provides the method of any one of Aspects 50-63, wherein the solution has a concentration of the quantum dots of 0.1 mg/mL to 1 mg/mL Aspect 65 provides the method of any one of Aspects 50-64, further comprising rinsing the treated glass with an organic solvent.

Aspect 66 provides the method of any one of Aspects 50-65, further comprising drying the treated glass.

Aspect 67 provides the method of Aspect 66, wherein the drying comprises drying under vacuum at room temperature.

Aspect 68 provides the method of any one of Aspects 50-67, wherein the glass comprises pores having a greater diameter than the quantum dots doped in the glass.

Aspect 69 provides the method of any one of Aspects 50-68, wherein the glass comprises a pore size of 1 nm to 50 nm.

Aspect 70 provides the method of any one of Aspects 50-69, wherein the glass comprises a pore size of 2 nm to 20 nm.

Aspect 71 provides the method of any one of Aspects 50-70, wherein the glass comprises porous borosilicate glass.

Aspect 72 provides the method of any one of Aspects 50-71, wherein the glass comprises an alkali-borosilicate glass that has been phase separated and has had the resulting alkali- and boric acid-rich phase dissolved in acid without subsequent melting to consolidate pores thereof.

Aspect 73 provides the method of Aspect 72, wherein the glass comprises about 96 wt % silica and about 4 wt % boron trioxide.

Aspect 74 provides the method of any one of Aspects 50-73, wherein the porous glass is borosilicate glass formed using a phase separation temperature of 560° C. to 600° C.

Aspect 75 provides the method of any one of Aspects 50-74, wherein the glass is borosilicate glass formed without use of HF, either using (a) an acid-leaching for of 3 days to 30 days; or (b) heated water leaching for 16 hours to 2 days (for example, with water temperature of at least 90 anneal-ing).

Aspect 76 provides the method of any one of Aspects 50-75, further comprising-modifying the glass prior without using HF prior to the treatment with the solution comprising the quantum dots.

Aspect 77 provides the method of Aspect 76, wherein the modification comprises modification of the internal surface of the glass with $H_2SO_4$, $HNO_3$, $HCl$, $H_3PO_4$, ascorbic acid, actic acid, $H_2O$, or combinations thereof.

Aspect 79 provides the methods described above, wherein the glass is annealed prior and/or after to leaching and/or modification, wherein the annealing comprises annealing in air.

Aspect 80 provides the method of any one of Aspects 79, wherein the annealing comprises annealing at 300° C. to 800° C. for 1 min to 8 h.

Aspect 81 provides the method of any one of Aspects 79, wherein the annealing comprises annealing at 550° C. to 650° C. for 30 min to 2 h.

Aspect 82 provides the method of any one of Aspects 50-81, further comprising modifying the quantum dots prior to the treatment of the glass with the solution, the modifying comprising modifying the quantum dots with a surface-modifying material that reduces surface defects in the quantum dot, changes surface chemistry of the quantum dot, and/or increases quantum yield of the quantum dots doped in the glass.

Aspect 83 provides the method of Aspect 82, wherein the surface-modifying material comprises $I_2$, $Br_2$, $Cl_2$, an alkyl-carboxylate acid, an alkyl amine, an alkyl thiol, a metal alkyl-carboxylate complex, or a combination thereof.

Aspect 84 provides the method of any one of Aspects 50-82, wherein the quantum dots comprise more than one type of quantum dot.

Aspect 85 provides the method of any one of Aspects 50-83, wherein the quantum dots have a diameter of 1 nm to 50 nm.

Aspect 86 provides the method of any one of Aspects 50-84, wherein the quantum dots have a diameter of 2 nm to 20 nm.

Aspect 87 provides the method of any one of Aspects 56-91, wherein the quantum dots comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, core/shell structures of any combination thereof, or combinations thereof.

Aspect 88 provides the method of any one of Aspects 50-87, wherein the quantum dots comprise core/shell quantum dots, wherein the core and the shell independently comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, or combinations thereof.

Aspect 89 provides the method of any one of Aspects 56-88, wherein the quantum dots comprise CdSe.

Aspect 90 provides the method of any one of Aspects 50-89, wherein the quantum dots comprise ZnS.

Aspect 91 provides the method of any one of Aspects 50-90, wherein the quantum dots comprise CdSe/ZnS core/shell quantum dots.

Aspect 92 provides the method of any one of Aspects 50-91, further comprising sealing the quantum dots within the glass.

Aspect 93 provides the method of any one of Aspects 50-92, further comprising sealing the quantum dots within the glass via one or more layers of optically transparent material.

Aspect 94 provides the method of Aspect 93, wherein the one or more layers independently comprise a thickness of 1 nm to 1500 nm.

Aspect 95 provides the method of any one of Aspects 93-94, wherein the one or more layers independently comprise a thickness of 5 nm to 1000 nm.

Aspect 96 provides the method of any one of Aspects 94-95, comprising using atomic layer deposition to deposit the one or more layers comprising a layer comprising $Al_2O_3$, $SiO_2$, $Si_3N_4$, or a combination thereof.

Aspect 9w7 provides the method of any one of Aspects 56-91, wherein the quantum dots comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, core/shell structures of any combination thereof, or combinations thereof.

Aspect 98 provides the method of any one of Aspects 50-87, wherein the quantum dots comprise core/shell quantum dots, wherein the core and the shell independently comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, or combinations thereof.

Aspect 99 provides the method of any one of Aspects 93-98, wherein sealing the quantum dots within the glass comprises using atomic layer deposition to deposit the one or more layers comprising a layer adjacent to the glass comprising $Al_2O_3$, $SiO_2$, $Si_3N_4$, or a combination thereof, that has a thickness of 5-10 nm, and performing PVD- or PECVD-deposition to deposit a layer thereon having a thickness of 100 nm to 1000 nm.

What is claimed is:

1. A quantum dot-doped glass comprising:

glass comprising quantum dots in pores in the glass, wherein:

(i) the glass comprises not greater than 0.1 wt % of F in a 100 nm deep layer adjacent to the external surface of the glass; and (ii) and the quantum dots situated within the glass have a photoluminescence quantum yield of ≥10%; and (iii) the quantum dots are 0.0001 wt % to 5 wt % of the quantum dot-doped glass, and wherein the quantum dots have a diameter of 1 nm to 50 nm.

2. The quantum dot-doped glass of claim 1, wherein the quantum dots have a photoluminescence quantum yield of $\geq 30\%$.

3. The quantum dot-doped glass of claim 1, wherein the glass comprises porous borosilicate glass.

4. The quantum dot-doped glass of claim 1, wherein the quantum dots have a diameter of 1 nm to 10 nm.

5. The quantum dot-doped glass of claim 1, wherein the glass comprises: 60 to 80 mole % $SiO_2$; 0 to 12 mole % $Na_2O$, and 20 to 35 mole % $B_2O_3$.

6. The quantum dot-doped glass of claim 5, wherein the glass comprises: 60 to 70 mole % $SiO_2$; 0 to 10 mole % $Na_2O$, and 20 to 35 mole % $B_2O_3$.

7. The quantum dot-doped glass of claim 5, wherein the glass comprises: 60 to 70 mole % $SiO_2$; 5 to 12 mole % $Na_2O$, and 20 to 30 mole % $B_2O_3$.

8. The quantum dot-doped glass of claim 5, wherein the glass comprises: 60 to 70 mole % $SiO_2$; 7 to 10 mole % $Na_2O$, and 20 to 30 mole % $B_2O_3$.

9. The quantum dot-doped glass of claim 5, wherein the quantum dots have a diameter of 1 nm to 10 nm.

10. The quantum dot-doped glass of claim 1, wherein the quantum dots comprise ZnO, ZnS, ZnSe, ZnTe, CdS, CdSe, CdTe, HgTe, HgSe, HgS, InAs, InP, InSb, Si, C, Ge, PbS, PbSe, PbTe, $CuInS_2$, $CsPbCl_3$, $CsPbBr_3$, $CsPbI_3$, alloys thereof, core/shell structures of any combination thereof, or combinations thereof.

11. A quantum dot-doped glass comprising:

glass comprising quantum dots in pores in the glass, wherein:

(i) the glass comprises not greater than 0.1 wt % of F in a 100 nm deep layer adjacent to the external surface of the glass; and (ii) and the quantum dots situated within the glass have a photoluminescence quantum yield of $\geq 10\%$; and (iii) the pores comprising the quantum dots are in a surface layer of the glass, the surface layer having a thickness of 1 micron to 2000 microns, and the pores having a pore size of 1 nm to 50 nm.

12. The quantum dot-doped glass of claim 11, wherein the quantum dots are 0.0001 wt % to 5 wt % of the quantum dot-doped glass, and wherein the quantum dots have a diameter of 1 nm to 50 nm.

13. A quantum dot-doped glass comprising:

glass comprising quantum dots in pores in the glass, wherein:

(i) the glass comprises not greater than 0.1 wt % of F in a 100 nm deep layer adjacent to the external surface of the glass; and (ii) and the quantum dots situated within the glass have a photoluminescence quantum yield of $\geq 10\%$; and (iii) the quantum dots comprise CdSe/ZnS core/shell quantum dots.

* * * * *